US009098302B2

(12) United States Patent
Swanson et al.

(10) Patent No.: US 9,098,302 B2
(45) Date of Patent: Aug. 4, 2015

(54) SYSTEM AND APPARATUS TO IMPROVE BOOT SPEED IN SERIAL PERIPHERAL INTERFACE SYSTEM USING A BASEBOARD MANAGEMENT CONTROLLER

(75) Inventors: Robert Swanson, Olympia, WA (US); Mallik Bulusu, Olympia, WA (US); Palsamy Sakthikumar, Puyallup, WA (US); Ramamurthy Krithivas, Chandler, AZ (US); James Steven Burns, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 252 days.

(21) Appl. No.: 13/536,449

(22) Filed: Jun. 28, 2012

(65) Prior Publication Data

US 2014/0006764 A1    Jan. 2, 2014

(51) Int. Cl.
*G06F 9/00* (2006.01)
*G06F 9/44* (2006.01)

(52) U.S. Cl.
CPC ............ *G06F 9/4406* (2013.01); *G06F 9/4401* (2013.01)

(58) Field of Classification Search
CPC ................................. G06F 9/00; G06F 9/4401
USPC ............................................................ 703/2
See application file for complete search history.

(56) References Cited

U.S. PATENT DOCUMENTS

| | | | | |
|---|---|---|---|---|
| 6,026,481 A * | 2/2000 | New et al. | .......................... | 712/43 |
| 6,233,681 B1 * | 5/2001 | Kang | .................. | 713/2 |
| 7,293,173 B2 * | 11/2007 | Field | .............................. | 713/165 |
| 7,421,688 B1 * | 9/2008 | Righi et al. | .................... | 717/172 |
| 7,908,470 B1 * | 3/2011 | Cavanna | ............................ | 713/2 |
| 7,962,736 B1 * | 6/2011 | Polyudov | ............................ | 713/2 |
| 8,499,295 B2 * | 7/2013 | Selvam | .......................... | 717/168 |
| 8,863,309 B2 * | 10/2014 | Wang et al. | .................... | 726/30 |
| 2003/0051125 A1 * | 3/2003 | Lu | ...................................... | 713/1 |
| 2003/0074657 A1 * | 4/2003 | Bramley, Jr. | .................. | 717/168 |
| 2004/0093359 A1 * | 5/2004 | Sharpe et al. | .................. | 707/201 |
| 2004/0139310 A1 * | 7/2004 | Maeda et al. | ..................... | 713/2 |
| 2005/0021933 A1 * | 1/2005 | Wang et al. | ....................... | 713/1 |
| 2005/0108515 A1 * | 5/2005 | Rangarajan et al. | ............. | 713/2 |
| 2005/0204123 A1 * | 9/2005 | Lee | ...................................... | 713/2 |
| 2005/0210228 A1 * | 9/2005 | Miller et al. | ...................... | 713/1 |
| 2005/0223209 A1 * | 10/2005 | Chang | ................................. | 713/2 |
| 2005/0283598 A1 * | 12/2005 | Gaskins et al. | ................... | 713/2 |
| 2006/0010264 A1 * | 1/2006 | Rader et al. | ...................... | 710/23 |
| 2006/0015861 A1 * | 1/2006 | Takata et al. | .................. | 717/168 |
| 2006/0020780 A1 * | 1/2006 | Hobson | ............................ | 713/2 |
| 2006/0136703 A1 * | 6/2006 | Wisecup et al. | .................. | 713/2 |
| 2006/0248327 A1 * | 11/2006 | Chang et al. | ..................... | 713/2 |
| 2006/0253555 A1 * | 11/2006 | Leung | .............................. | 709/220 |
| 2007/0055853 A1 * | 3/2007 | Hataaki et al. | .................. | 713/1 |
| 2007/0113067 A1 * | 5/2007 | Oh et al. | .......................... | 713/2 |
| 2007/0157051 A1 * | 7/2007 | Hernandez et al. | ............... | 714/1 |
| 2007/0174603 A1 * | 7/2007 | Wang | .............................. | 713/2 |
| 2007/0186086 A1 * | 8/2007 | Lambert et al. | .................. | 713/1 |

(Continued)

*Primary Examiner* — Thomas Lee
*Assistant Examiner* — Santosh R Poudel
(74) *Attorney, Agent, or Firm* — Hanley, Flight & Zimmerman, LLC (57) ABSTRACT

Methods and apparatus are disclosed to improve system boot speed. A disclosed example method includes associating a first serial peripheral interface (SPI) with a baseboard management controller (BMC), copying an image from the first SPI to a volatile memory in response to receiving power at the BMC, and in response to receiving an access request associated with the first SPI, providing access to the image stored in the volatile memory.

22 Claims, 8 Drawing Sheets

(56) References Cited

U.S. PATENT DOCUMENTS

| | | | |
|---|---|---|---|
| 2007/0234123 A1* | 10/2007 | Shih et al. | 714/36 |
| 2007/0260866 A1* | 11/2007 | Wang et al. | 713/2 |
| 2008/0065845 A1* | 3/2008 | Montero et al. | 711/162 |
| 2008/0209198 A1* | 8/2008 | Majni et al. | 713/2 |
| 2008/0294838 A1* | 11/2008 | Houston et al. | 711/103 |
| 2008/0313312 A1* | 12/2008 | Flynn et al. | 709/221 |
| 2008/0320204 A1* | 12/2008 | Jo et al. | 711/100 |
| 2009/0063810 A1* | 3/2009 | Garcia-Tobin | 711/209 |
| 2009/0172623 A1* | 7/2009 | Cross et al. | 716/9 |
| 2009/0182995 A1* | 7/2009 | Muir | 713/1 |
| 2009/0307481 A1* | 12/2009 | Wisecup et al. | 713/2 |
| 2010/0287363 A1* | 11/2010 | Thorsen | 713/2 |
| 2011/0016300 A1* | 1/2011 | Lee | 713/2 |
| 2011/0258426 A1* | 10/2011 | Mujtaba et al. | 713/2 |
| 2012/0042257 A1* | 2/2012 | Aftab et al. | 715/738 |
| 2012/0072897 A1* | 3/2012 | Selvam | 717/171 |
| 2013/0007430 A1* | 1/2013 | Fan | 713/1 |
| 2013/0185549 A1* | 7/2013 | Hu | 713/2 |

* cited by examiner

SYSTEM AND APPARATUS TO IMPROVE BOOT SPEED IN SERIAL PERIPHERAL INTERFACE SYSTEM USING A BASEBOARD MANAGEMENT CONTROLLER

FIELD OF THE DISCLOSURE

This disclosure relates generally to platform optimization, and, more particularly, to methods, systems and apparatus to improve system boot speed.

BACKGROUND

High density systems, such as high performance computing (HPC) systems and system on a chip (SoC) systems typically employ two or more processors on a single planar or a single baseboard. Each of the multiple processors may operate in an independent manner and utilize its own set of resources, such as volatile and non-volatile memory. As the number of processors in HPC and/or SoC systems increases, a corresponding increase in supporting resources results.

DETAILED DESCRIPTION

Traditional server platforms employ non-volatile memory, such as flash and/or read-only-memory (ROM), to store boot loader information/images. In high density systems, such as high performance computing (HPC) systems and system on a chip (SoC) systems, each processor includes a corresponding set of supporting resources, including flash, ROM, volatile memory (e.g., random-access-memory (RAM)), etc. Each processor in a high density system is sometimes referred to as a node, which may operate independently from one or more other nodes on a shared planar or baseboard.

Each planar or baseboard that includes any number of nodes typically includes a management module, such as a baseboard management controller (BMC) or a micro management controller (MMC). To boot each node, a corresponding serial peripheral interface (SPI) flash device is implemented to, in part, store basic input/output system (BIOS) information/code. The SPI flash device (hereinafter referred to herein as "SPI") is typically implemented as a flash part or device that is a type of non-volatile memory, which connects to each node (e.g., to each SoC package and/or SoC device in an SoC system, or each platform controller hub (PCH) in a multi-node socket server system). With each node including a corresponding SPI, management of numerous SPIs becomes burdensome and costly. In mid 2012, each SPI may cost approximately $1.50 (U.S.). For an example baseboard containing four (4) nodes and four (4) corresponding SPIs, approximately $6.00 (U.S.) in hardware cost is associated with each baseboard. Example methods, apparatus and/or systems disclosed herein reduce a number of SPIs associated with each baseboard system (e.g., an SoC system, a socket server system, etc.), and allow for relatively faster transfer of BIOS execution in response to one or more reset vector request(s) from each node of a corresponding baseboard.

Figure 1:
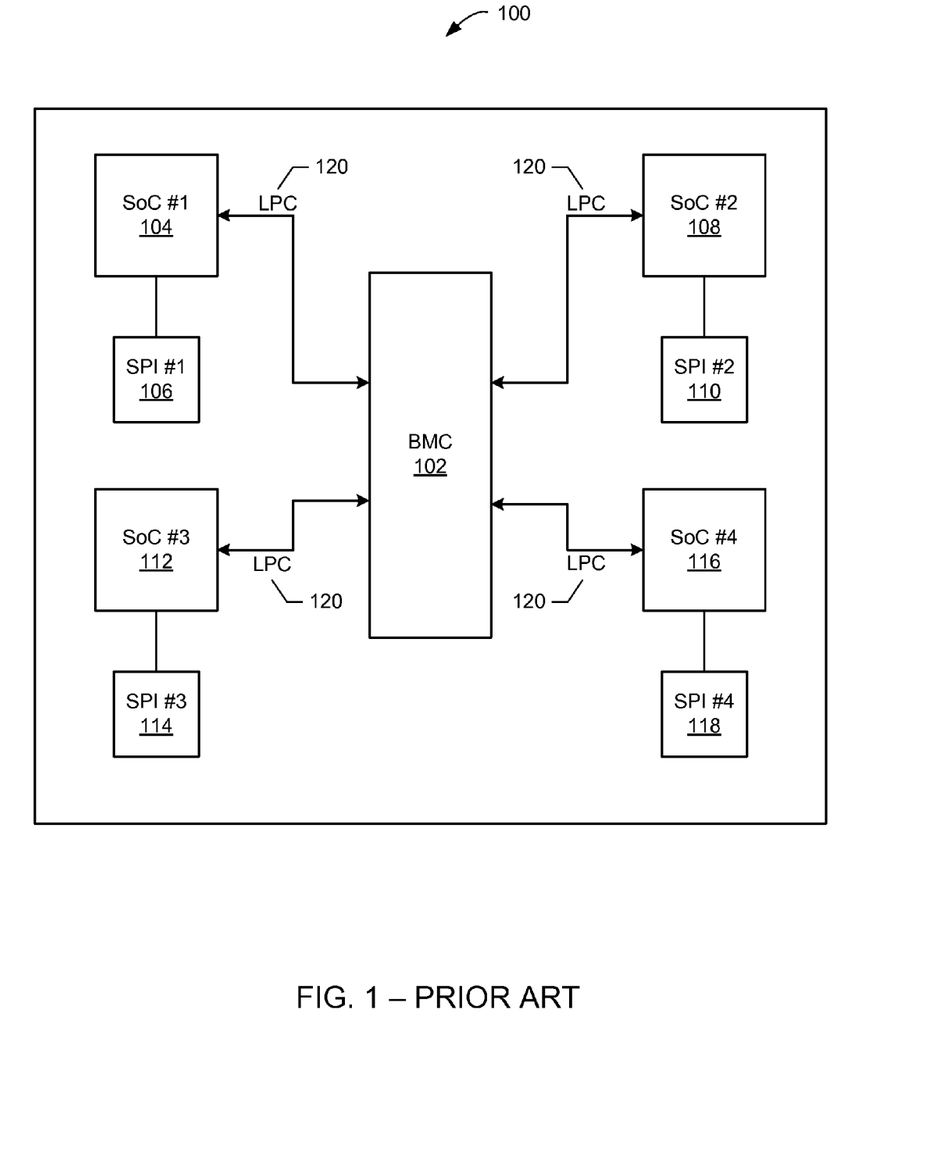
FIGS. 1 and 2 are schematic illustrations of prior-art platforms.

FIG. 1 illustrates a prior-art SoC system 100 that includes a BMC 102 communicatively connected to a first SoC (e.g., a first node) 104 having a first corresponding SPI 106, a second SoC (e.g., a second node) 108 having a second corresponding SPI 110, a third SoC (e.g., a third node) 112 having a third corresponding SPI 114, and a fourth SoC (e.g., a fourth node) 116 having a fourth corresponding SPI 118. Each node (104, 108, 112, 116) is communicatively connected to the BMC 102 via a low pin count (LPC) interface 120. In operation, a node boots by invoking a reset vector to an attached SPI, in which the SPI stores boot code, operating system (OS) code and/or any other code (e.g., one or more applications). In the event one or more nodes of a baseboard are employed to simultaneously facilitate the same or similar task(s), then each SPI is duplicated. In the illustrated example of FIG. 1, SPIs are duplicated four times with the first SPI 106, the second SPI 110, the third SPI 114 and the fourth SPI 118.

Figure 2:
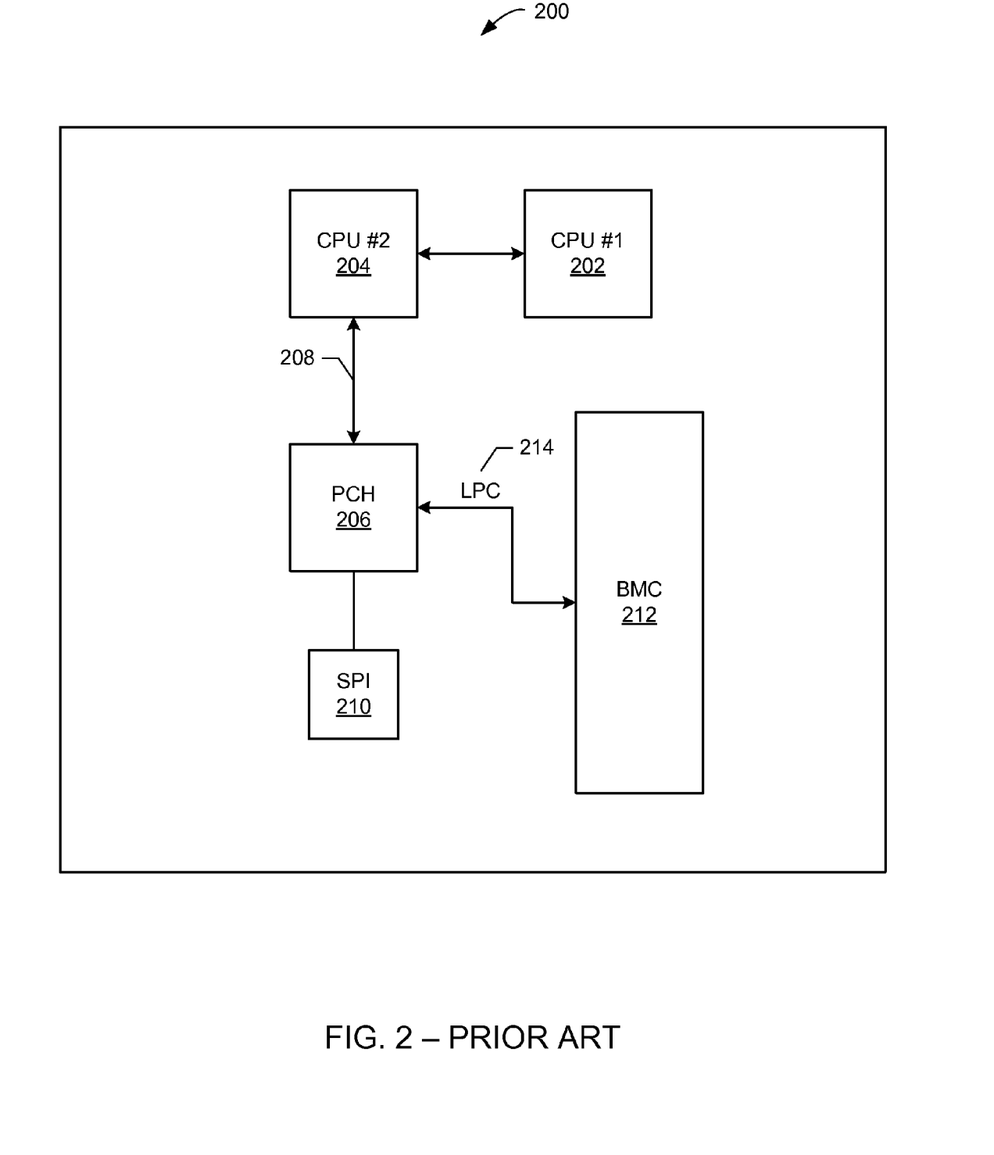

FIG. 2 is a schematic illustration of a prior-art socket server system 200 that includes a first central processing unit (CPU) 202, a second CPU 204, and a platform controller hub (PCH) 206 communicatively connected via a direct media interface (DMI) link 208. The example PCH 206 of the system 200 also includes an SPI 210 communicatively connected thereto, and a BMC 212 communicatively connected to the example PCH 206 via an LPC interface 214. In operation, a reset vector is invoked upon power-up by one or both of the first CPU 202 or the second CPU 204. The invoked reset vector propagates to the example PCH 206 and to the SPI 210 for boot instructions stored thereon. In some examples, the invoked reset vector may, instead, propagate to the BMC 212 to an attached SPI when the example PCH 206 does not include a corresponding SPI. In either example configuration, reset vector request(s) are received by non-volatile memory (e.g., the example SPI 210), which is substantially slower than volatile memory.

Methods, systems, apparatus and/or articles of manufacture disclosed herein facilitate a reduction in SPI device duplication and/or increase responsivity in response to reset vector invocation on HPC and/or SoC systems. In some examples, baseboards having four SoCs eliminate three duplicative SoCs, thereby yielding a hardware cost savings of approximately $4.50. While the illustrated examples disclosed herein include SoC systems having four SoCs and socket servers having two CPUs, methods, systems, apparatus and/or articles of manufacture disclosed herein are not limited thereto.

Figure 3:
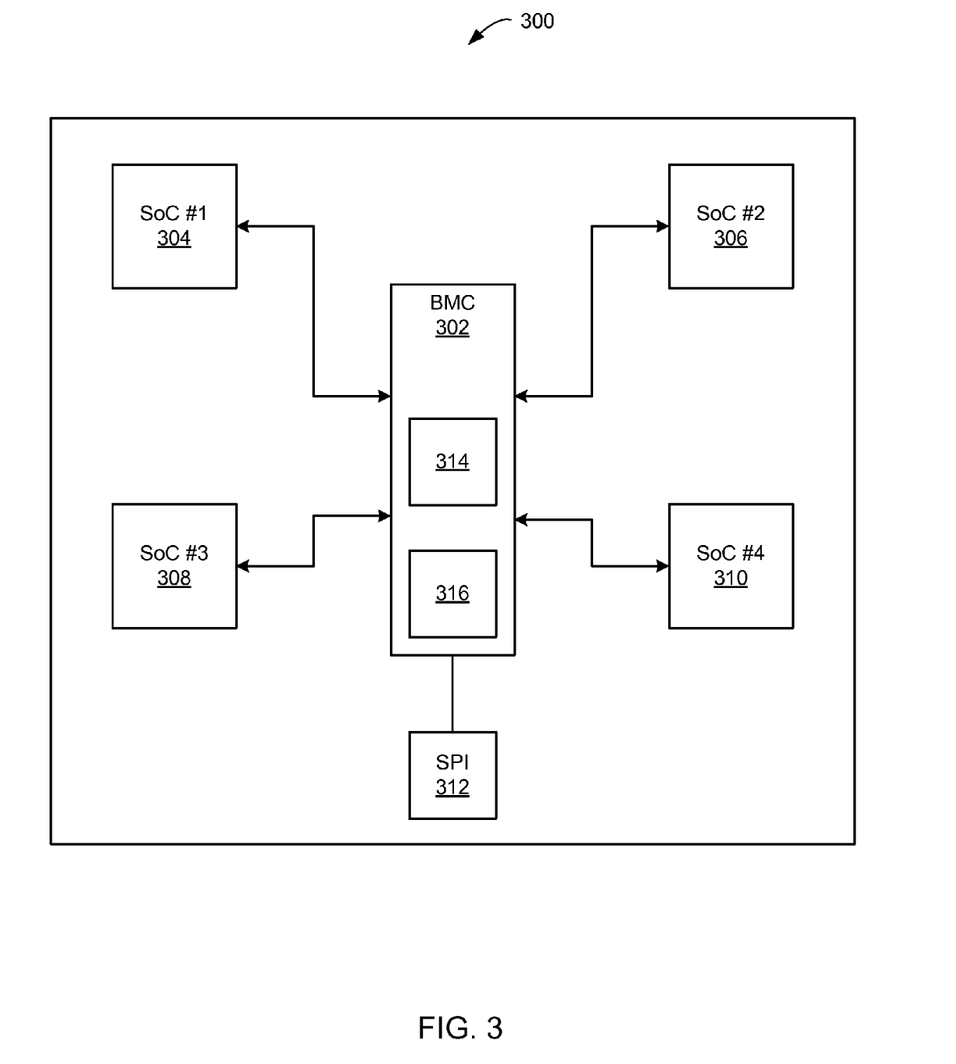
FIG. 3 is a schematic illustration of an example system-on-a-chip (SoC) platform consistent with the teachings of this disclosure to improve system boot speed.

FIG. 3 is a schematic illustration of an example SoC system (e.g., a baseboard, a planar, a platform, etc.) 300 that includes a BMC 302 communicatively connected to a first SoC (e.g., a first node) 304, a second SoC (e.g., a second node) 306, a third SoC (e.g., a third node) 308 and a fourth SoC (e.g., a fourth node) 310. In contrast with the prior-art SoC system 100 of FIG. 1, one of the nodes (304-310) in the example SoC system 300 of FIG. 3 does not include a dedicated SPI. Instead, a single SPI device 312 is communicatively connected to the example BMC 302 to store boot image(s) and/or other code for any or all of the nodes (304-310) of the example system 300. The example BMC 302 of FIG. 3 also includes a boot optimizer 314 that, as described in further detail below, includes and/or is communicatively connected to relatively higher speed volatile memory 316 as compared to the non-volatile SPI device 312. While the example boot optimizer 314 and the example volatile memory 316 of FIG. 3 are shown as part of the example BMC 302, in other example methods, systems, apparatus and/or articles of manufacture disclosed herein the example boot optimizer 314 and/or the example volatile memory 316 resides, instead, anywhere else on the example system 300 of FIG. 3 and/or, as described in further detail below, anywhere else on the example system 500 of FIG. 5.

Figure 4:
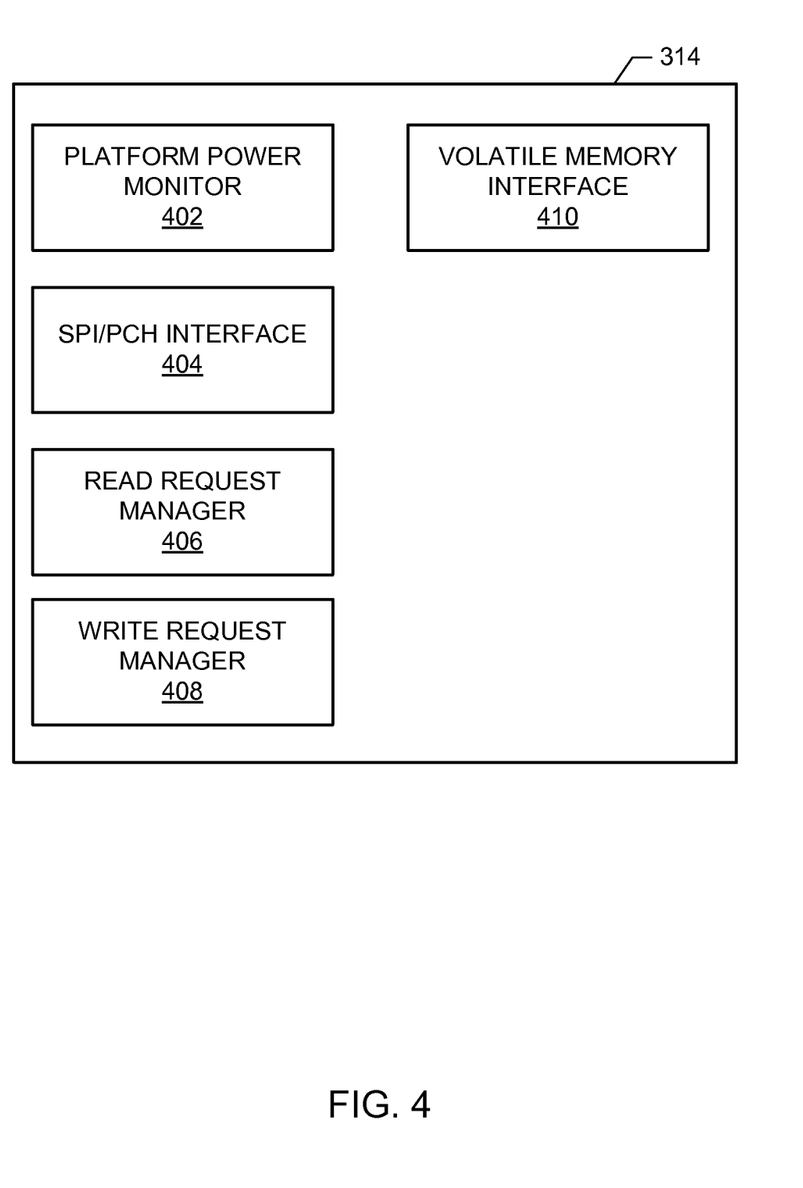
FIG. 4 is a schematic illustration of an example boot optimizer of the example SoC platform of FIG. 3.

FIG. 4 is a schematic illustration of an example implementation of the example boot optimizer 314 of FIG. 3. In the illustrated example of FIG. 4, the boot optimizer 314 includes a platform power monitor 402, a SPI/PCH interface 404, a read request manager 406, a write request manager 408 and a volatile memory interface 410. In operation, the example platform power monitor 402 monitors the example baseboard 300 for an indication of power-up. In response to detecting baseboard 300 power-up, such as when power is applied to the plurality of nodes 304-310 after a powered-down condition, the example SPI/PCH interface 404 interrogates and/or otherwise searches the example baseboard 300 for one or more SPI device(s). If an SPI device is detected by the example SPI/PCH interface 404, contents from the non-volatile SPI device (e.g., SPI 312) are transferred to the volatile memory 316 (e.g., random access memory (RAM), dynamic RAM (DRAM), synchronous DRAM (SDRAM), double data rate RAM/DRAM/SDRAM, etc.). As described above, one or more types of volatile memory including, but not limited to, DDR4 DRAM, exhibit relatively faster speeds and lower power consumption when compared to non-volatile memory.

In the illustrated example of FIGS. 3 and 4, the transfer of SPI device contents, such as boot images, to the volatile memory 316 occurs in response to the power-on condition, but may not be needed again until a subsequent power-down condition occurs. Typically, high density systems (e.g., high density HPC and/or SoC systems) and server systems (e.g., server farms) are not powered down to maintain around-the-clock services. Once data from the example SPI device 312 has been transferred to the volatile memory 316, such data remains in volatile memory until a power-off/down condition occurs, either intentionally (e.g., for maintenance) or unintentionally (e.g., power failure). In response to the example read request manager 406 detecting one or more nodes (e.g., 304-310) initiating a boot vector request and/or other data, access is directed to the example volatile memory 316 instead of to the example SPI device 312. A benefit of bypassing the example SPI device 312, and/or otherwise blocking read access requests to the example SPI device 312, is that the relatively faster volatile memory 316 returns such requested data to the requesting node in a shorter amount of time. Additionally, because each node (e.g., 304-310) is directed to the example volatile memory 316, duplicative SPI devices may be eliminated from the example baseboard 300 of FIG. 3.

The example boot optimizer 314 of FIG. 4 modifies access privileges to the example SPI 312 and/or modifies access privileges to one or more SPIs (e.g., legacy SPI devices) that may be communicatively connected to one or more SoC packages (e.g., the first SoC 304, the second SoC 306, the third SoC 308, the fourth SoC 310, etc.) of the example system 300. In the event a legacy platform employs the example boot optimizer 314 of FIGS. 3 and 4, in which the legacy platform has one or more associated SPI device(s) communicatively connected to corresponding processor(s) (e.g., connected to one or more CPUs, SoCs, etc.), then the example read request manager 406 modifies access attempts thereto. Modification may include, but is not limited to blocking access requests, restricting access requests, substituting and/or otherwise redirecting/replacing access requests from the legacy SPI(s) to the volatile memory. Accordingly, even legacy systems may participate in one or more performance gains of one or more of the example methods, apparatus, systems and/or articles of manufacture disclosed herein.

In the event instructions (e.g., a boot image, portions of BIOS, application programs, OS, etc.) are to be updated in the example SPI device 312 of FIG. 3, the example write request manager 408 of FIG. 4 monitors for a write access request. The example write request manager 408 of FIG. 4 invokes the example SPI/PCH interface 404 to write and/or otherwise update the example SPI device 312 with information from the write request. One or more write requests may be scrutinized by security protocol(s) and/or require proper authentication credentials before allowing the write request to propagate to the example SPI device 312. In response to an indication that one or more write operation(s) were successful, the example write request manager 408 invokes the volatile memory interface 410 to update the example volatile memory 316. If power is intentionally or unintentionally removed from the example baseboard 300, data from the one or more write operations remains in the example SPI device 312 and may thereafter be transferred to the example volatile memory 316, as described above.

Figure 5:
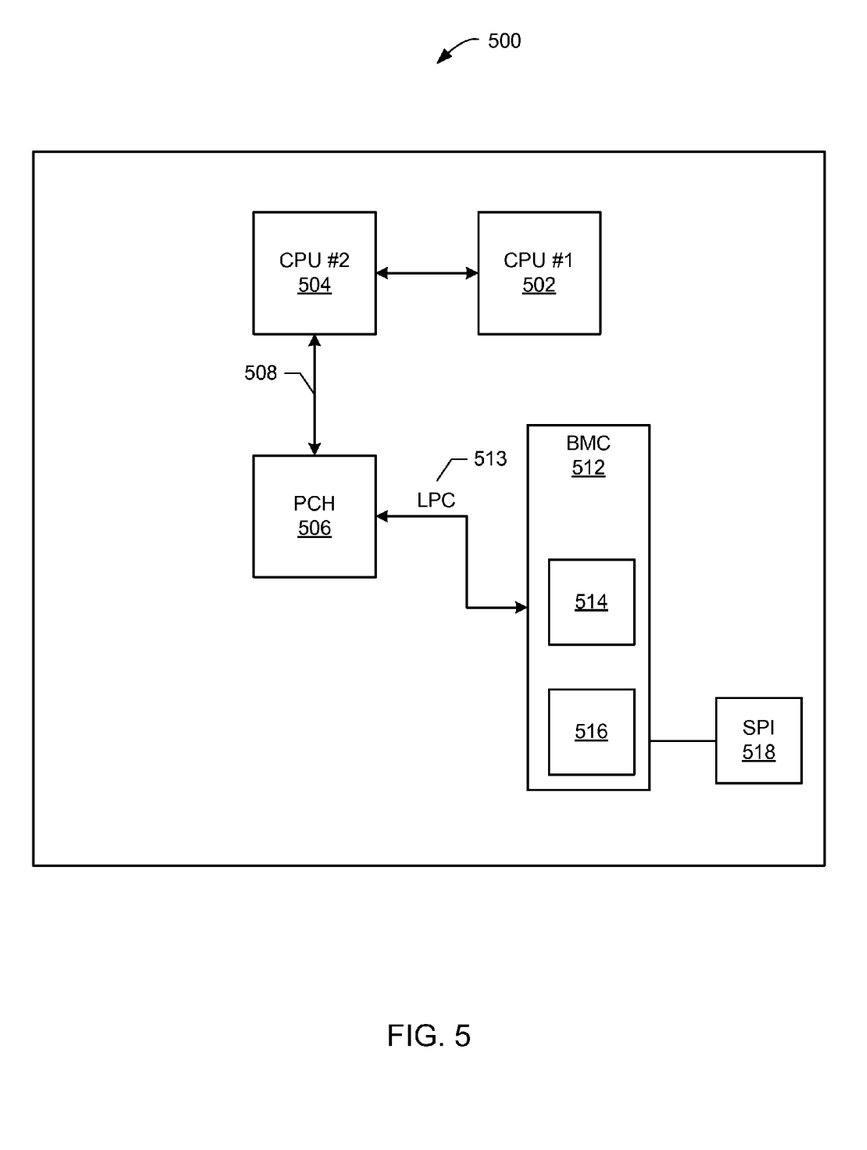
FIG. 5 is a schematic illustration of an example socket server platform consistent with the teachings of this disclosure.

FIG. 5 is a schematic illustration of an example socket server system (e.g., a baseboard, a planar, a platform, etc.) 500 that includes a first CPU 502, a second CPU 504, and a PCH 506 communicatively connected via a DMI link 510. The example PCH 506 of the system 500 is communicatively connected to a BMC 512 via an LPC interface 513. While the example LPC interface 513 is disclosed and shown in the figures, any other physical interface may be employed that is capable of carrying and/or otherwise storing the software image(s) (LPC, eSPI, PCIe, etc.). The example BMC 512 includes a boot optimizer 514, such as the example boot optimizer 314 of FIGS. 3 and 4, communicatively connected to volatile memory 516 and an SPI device 518. Generally speaking, the example boot optimizer 514 of FIG. 5 is substantially the same as the example boot optimizer 314 of FIGS. 3 and 4, except that the boot optimizer 514 is configured to operate in the socket server system 500 rather than an SoC system. As such, references to the boot optimizer 314 and 514 will correspond to the example platform power monitor 402, the example SPI/PCH interface 404, the example read request manager 406, the example write request manager and/or the example volatile memory interface 410 of FIG. 4.

In contrast with the prior-art socket server system 200 of FIG. 2, the socket server system 500 of FIG. 5 removes the SPI device 210 previously connected to the PCH 506, and communicatively attaches the SPI device 518 to the example BMC 512. During power-up, the example platform power monitor 402 of the example boot optimizer 514 recognizes that platform power has been restored after a prior powered-down condition. The example SPI/PCH interface 404 interrogates and/or otherwise searches the example system 500 for one or more SPI device(s). If an SPI device is detected by the example SPI/PCH interface, contents from the non-volatile SPI device (e.g., SPI 518) are transferred to the volatile memory 516. Once data from the example SPI device 518 has been transferred to the volatile memory 516, such data remains in the example volatile memory until a power-off/down condition occurs. As such, further read request(s) invoked by the example first CPU 502 and/or the example second CPU 504 may occur much faster with the volatile memory 516 than they would otherwise occur with the relatively slower non-volatile SPI device 518.

While CPU cache memory is very fast, typical CPU cache sizes are less than 1 megabyte (MB) in size. BIOS images, on the other hand, are typically 4 MB in size, thereby making CPU cache utilization impractical. In some examples, the BMC may include an integrated 2D graphics controller, which may be of type DDR2 memory. As of early 2012, the smallest size dual in-line memory module (DIMM) of type DDR2 is 128 MB. From an embedded firmware perspective, 128 MB is a large amount of memory. 2D graphics controllers only use approximately 16 MB of such memory, and BIOS images typically consume approximately 4 MB of memory. Additionally, because the BMC memory is of type DDR2, bottleneck conditions exhibited by relatively slower read/write access attempts to non-volatile memory of the SPI device(s) are reduced (e.g., minimized).

While an example manner of implementing the example SoC system 300 and the example socket server system 500 to improve system boot speed has been illustrated in FIGS. 3-5, one or more of the elements, processes and/or devices illustrated in FIGS. 3-5 may be combined, divided, re-arranged, omitted, eliminated and/or implemented in any other way. Further, the example boot optimizer 314, 514, the example platform power monitor 402, the example SPI/PCH interface 404, the example read request manager 406, the example write request manager 408 and/or the example volatile memory interface 410 of FIGS. 3-5 may be implemented by hardware, software, firmware and/or any combination of hardware, software and/or firmware. Additionally, and as described below, the example boot optimizer 314, 514, the example platform power monitor 402, the example SPI/PCH interface 404, the example read request manager 406, the example write request manager 408 and/or the example volatile memory interface 410 of FIGS. 3-5 may be implemented by hardware, software, firmware and/or any combination of hardware, software and/or firmware. Thus, for example, any of the example boot optimizer 314, 514, the example platform power monitor 402, the example SPI/PCH interface 404, the example read request manager 406, the example write request manager 408 and/or the example volatile memory interface 410 of FIGS. 3-5 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example boot optimizer 314, 514, the example platform power monitor 402, the example SPI/PCH interface 404, the example read request manager 406, the example write request manager 408 and/or the example volatile memory interface 410 of FIGS. 3-5 are hereby expressly defined to include a tangible computer readable storage medium such as a memory, DVD, CD, Blu-ray, etc. storing the software and/or firmware. Further still, the example system 300 of FIG. 3 and the example system 500 of FIG. 5 may include one or more elements, processes and/or devices in addition to, or instead of, those illustrated in FIGS. 3-5, and/or may include more than one of any or all of the illustrated elements, processes and devices.

Figure 6A:
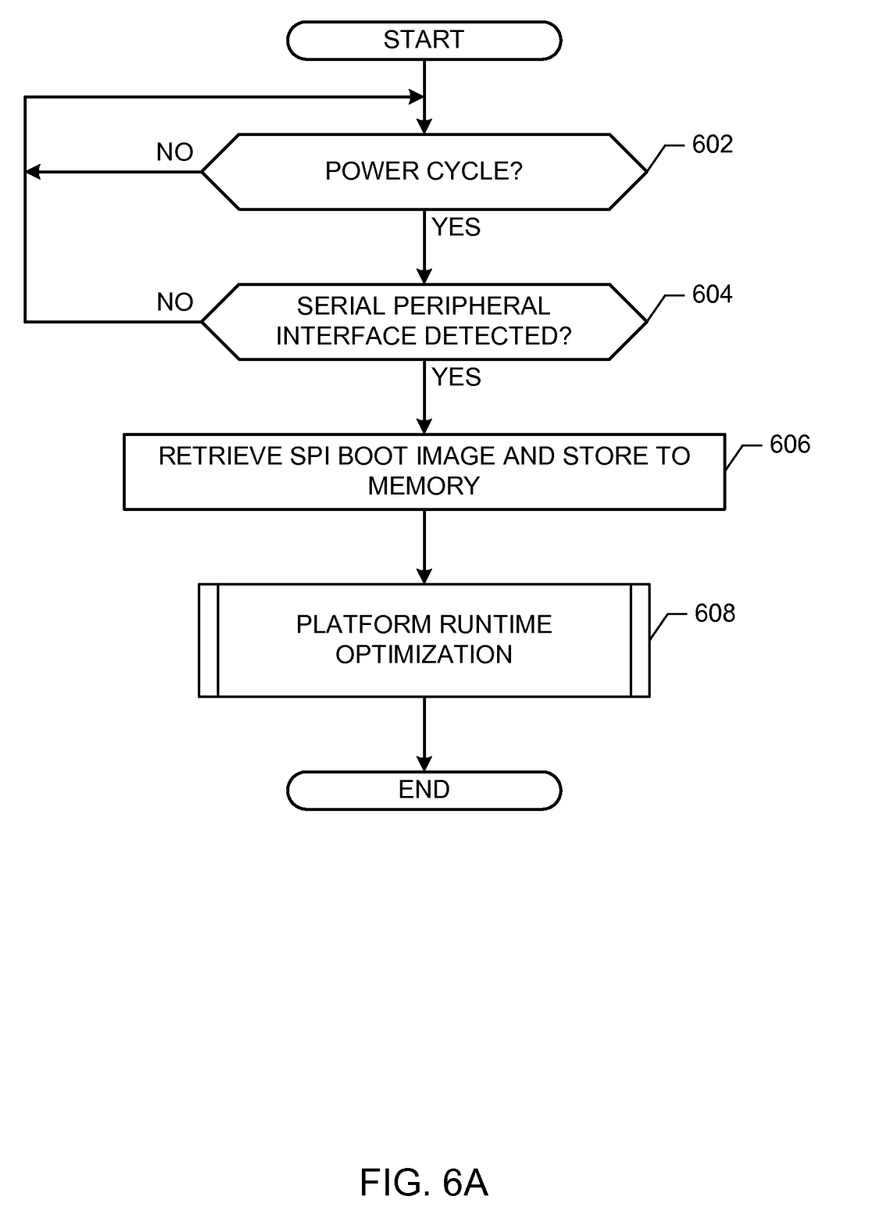
FIGS. 6A and 6B are flowcharts representative of example machine readable instructions which may be executed to improve system boot speed.
Figure 6B:
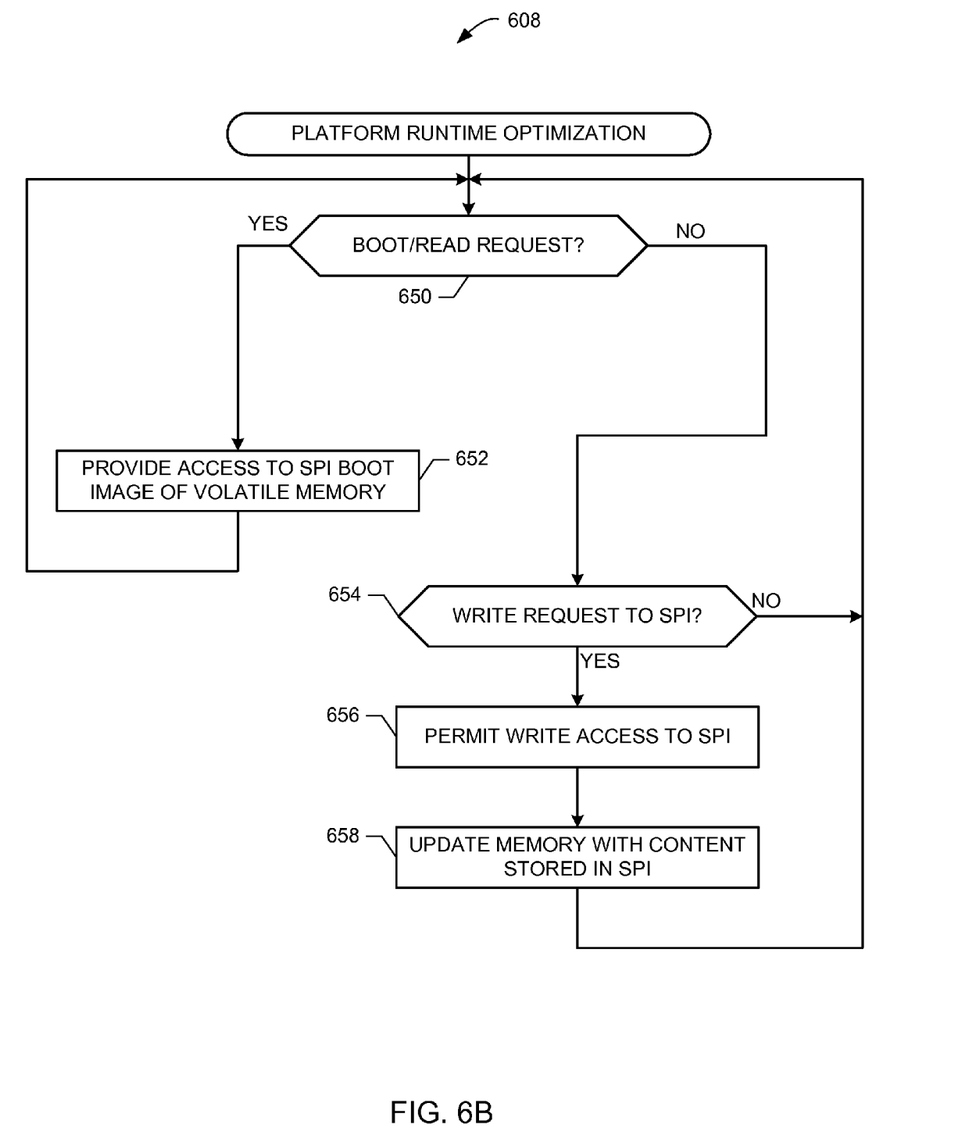

Flowcharts representative of example machine readable instructions for implementing the system 300 of FIG. 3, the system 500 of FIG. 5 and the example boot optimizer 314 of FIGS. 3-5 are shown in FIGS. 6A and 6B. In this example, the machine readable instructions comprise a program for execution by a processor such as the processor 712 shown in the example computer 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 6A and 6B, many other methods of implementing the example system 300, the example system 500 and the example boot optimizer 314 to improve system boot speed may alternatively be used. For example, the order of execution of the blocks may be changed, and/or some of the blocks described may be changed, eliminated, or combined.

As mentioned above, the example processes of FIGS. 6A and 6B may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage and to exclude propagating signals. Additionally or alternatively, the example processes of FIGS. 6A and 6B may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The program 600 of FIG. 6A begins at block 602 where the example platform power monitor 402 determines whether a power cycle has occurred on the example platform 300, 500. If not, then the example program 600 continues to wait, otherwise the example SPI/PCH interface 404 interrogates and/or otherwise searches the example platform/baseboard 300, 500 for one or more SPI device(s) (block 604). In the event the example SPI/PCH interface 404 does not locate and/or otherwise identify one or more SPI device(s) and/or other non-volatile memory that may store BIOS image(s) (block 604), then the program returns to block 602 to monitor for an instance of a power cycle. Generally speaking, because volatile memory of a baseboard/platform is erased when a power loss occurs (e.g., intentional or unintentional), the example platform power monitor 402 monitors for such a condition so that it can populate and/or re-populate volatile memory with some or all of the contents of an SPI device.

In the event an SPI device(s) is/are detected by the example SPI/PCH interface 404, the example SPI/PCH interface 404 invokes the example volatile memory interface 410 to transfer some or all contents from the SPI device(s) to volatile memory of the BMC (block 606). As described above, volatile memory (e.g., volatile memory 316 of FIG. 3, volatile memory 516 of FIG. 5) of the BMC (e.g., the example BMC 302 of FIG. 3, the example BMC 502 of FIG. 5) may operate in a manner substantially faster than its non-volatile counterpart SPI device (e.g., SPI 312 of FIG. 3, SPI 518 of FIG. 5). In some examples, volatile memory may be part of the example BMC (e.g., part of an integrated graphics controller), while in other examples the volatile memory may be communicatively connected to the example BMC. After retrieving some or all information from detected SPI device(s) and storing such information to volatile memory (block 606), the example boot optimizer 314, 514 performs runtime optimization of its corresponding platform/baseboard (e.g., the example SoC system 300 of FIG. 3, the example socket server system 500 of FIG. 5) (block 608).

The program 608 of FIG. 6B begins at block 650 where the example read request manager 406 monitors one or more nodes for a boot image request and/or a read request. While one or more nodes of a traditional SoC platform and/or a traditional socket server platform routed requests to a corresponding SPI device, the example boot optimizer 314 of FIG. 4 intercepts such request(s) and redirects them to volatile memory associated with the BMC (e.g., the example volatile memory 316 of the example BMC 302 of FIG. 3, the example volatile memory 516 of the example BMC 502 of FIG. 5). In response to receiving one or more read requests (block 650), which may be authenticated, the example read request manager 406 invokes the example volatile memory interface 410 to obtain and/or otherwise read information/data requested by the one or more requesting node(s) (block 652).

On the other hand, in the event that a boot or read request by one or more nodes is not detected by the example read request manager 406 (block 650), the example write request manager 408 determines whether a write request to an SPI is received (block 654). For instance, persons and/or entities chartered with the responsibility of managing HPC systems, such as SoC platform(s) and/or socket server platform(s), may need to manage node performance and/or boot instructions. While traditional SoC systems require management of each SPI device attached and/or otherwise associated with a corresponding node, methods, apparatus, systems and/or articles of manufacture disclosed herein consolidate such management to a single and/or reduced number of SPI device(s). HPC systems include data centers, which may have more than 30,000 nodes. Managing a large number of individual copies of BIOS, for example, creates a significant management burden that is reduced (e.g., minimized) via example methods, systems, apparatus and/or articles of manufacture disclosed herein.

If a write request has not been received (block 654), then the example program 608 returns to block 650 to monitor for a boot or read request. However, in response to detecting a write request (e.g., authenticated write request) to the SPI (block 654), the example write request manager 408 invokes the example SPI/PCH interface 404 to write information/data to the SPI (e.g., the example SPI 312 of FIG. 3, the example SPI 518 of FIG. 5) (block 656). When the write operation to the SPI is complete (block 656), the example volatile memory interface 410 is invoked by the example write request manager 408 to update volatile memory (e.g., the example volatile memory 316 of FIG. 3, the example volatile memory 516 of FIG. 5) with the data/information written to the SPI (block 658). Control returns to block 650 to monitor for a boot and/or read request from one or more nodes.

Figure 7:
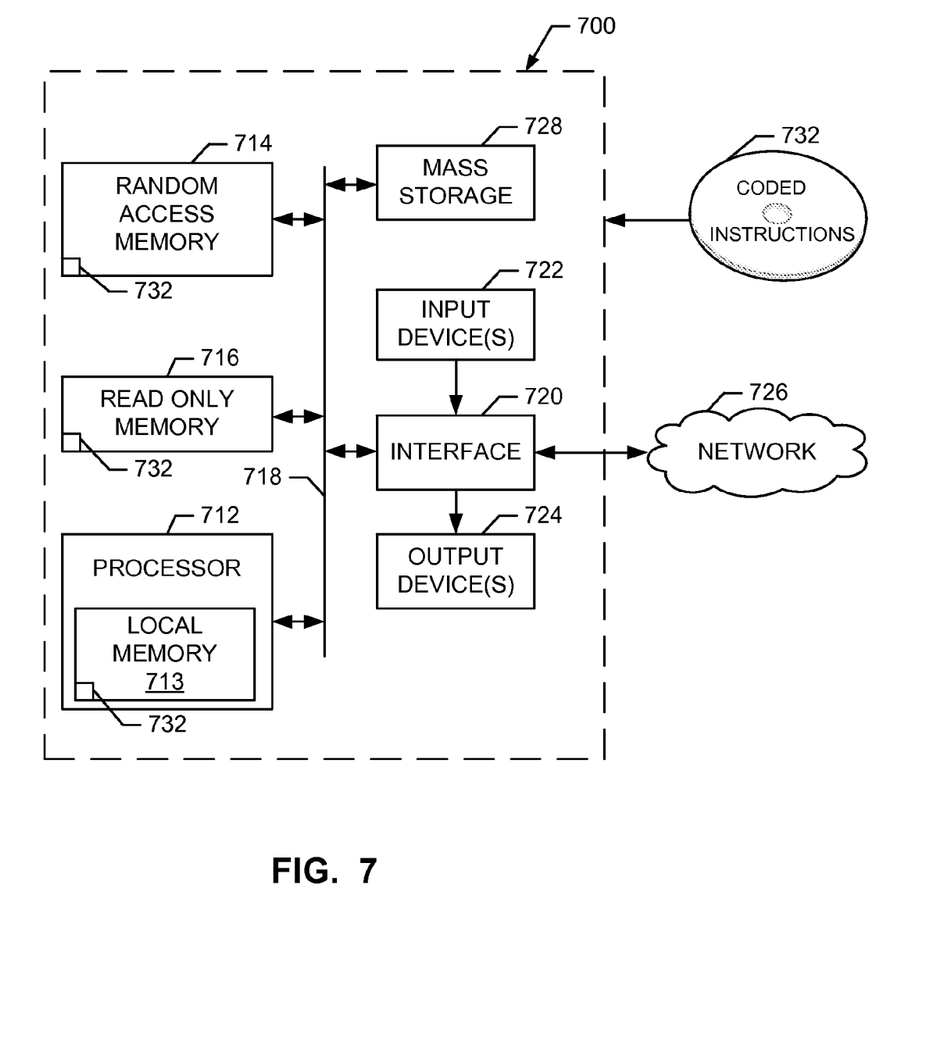
FIG. 7 is a schematic illustration of an example processor platform that may execute the instructions of FIGS. 6A and 6B to implement the example systems and apparatus of FIGS. 3-5.

FIG. 7 is a block diagram of an example processor platform 700 capable of executing the instructions of FIGS. 6A and 6B to implement the system 300 of FIG. 3, the system 500 of FIG. 5 and the boot optimizer 314 of FIGS. 3-5. The processor platform 700 can be, for example, a server, a personal computer, an Internet appliance, or any other type of computing device.

The system 700 of the instant example includes a processor 712. For example, the processor 712 can be implemented by one or more microprocessors or controllers from any desired family or manufacturer.

The processor 712 includes a local memory 713 (e.g., a cache) and is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 also includes an interface circuit 720. The interface circuit 720 may be implemented by any type of interface standard, such as an Ethernet interface, a universal serial bus (USB), and/or a PCI express interface.

One or more input devices 722 are connected to the interface circuit 720. The input device(s) 722 permit a user to enter data and commands into the processor 712. The input device(s) can be implemented by, for example, a keyboard, a mouse, a touchscreen, a track-pad, a trackball, isopoint and/or a voice recognition system.

One or more output devices 724 are also connected to the interface circuit 720. The output devices 724 can be implemented, for example, by display devices (e.g., a liquid crystal display, a cathode ray tube display (CRT), a printer and/or speakers). The interface circuit 720, thus, typically includes a graphics driver card.

The interface circuit 720 also includes a communication device such as a modem or network interface card to facilitate exchange of data with external computers via a network 726 (e.g., an Ethernet connection, a digital subscriber line (DSL), a telephone line, coaxial cable, a cellular telephone system, etc.).

The processor platform 700 also includes one or more mass storage devices 728 for storing software and data. Examples of such mass storage devices 728 include floppy disk drives, hard drive disks, compact disk drives and digital versatile disk (DVD) drives.

Coded instructions 732, such as the example instructions associated with FIGS. 6A and 6B, may be stored in the mass storage device 728, in the volatile memory 714, in the non-volatile memory 716, and/or on a removable storage medium such as a CD or DVD.

Methods, apparatus, systems and articles of manufacture to improve system boot speed substantially reduce (e.g., minimize) one or more bottlenecks associated with read/write operations between SPI devices and platform nodes. Additionally, because the number of SPI devices eliminated by example methods, apparatus, systems and/or articles of manufacture disclosed herein, substantial platform cost savings may be achieved.

Methods, systems, apparatus and articles of manufacture are disclosed to improve system boot speed. Some disclosed example methods include associating a first serial peripheral interface (SPI) with a baseboard management controller (BMC), copying an image from the first SPI to a volatile memory in response to receiving power at the BMC; and in response to receiving an access request associated with the first SPI, providing access to the image stored in the volatile memory. Additionally, the example methods include the BMC including the volatile memory. Other disclosed example methods include modifying access privileges to a second SPI associated with a platform processor. In some examples, the method includes modifying access privileges to the second SPI including at least one of blocking access to the second SPI, or restricting access to the second SPI. In other examples, the method includes modifying access including substituting access requests to the second SPI with access requests to the first SPI. In still other examples, the method includes the second SPI associated with at least one of a system-on-a-chip (SoC) package, or a processor of a socket server system. The example disclosed methods also include the access request including a reset vector request, while other example methods include permitting write access privileges to the first SPI in response to detecting a write request. Some example methods include authenticating the write request prior to permitting the write access privileges to the first SPI, while other example methods include redirecting write access privileges from a second SPI to the first SPI, the second SPI associated with at least one of a platform processor or a system-on-a-chip package. Still other example methods include updating the volatile memory with information associated with the write request after a write operation to the first SPI is complete, in which the information associated with the write request comprises an update to the image of the first SPI. Some example methods include the image from the first SPI having at least one of a boot image or a basic input/output system (BIOS) image.

Example apparatus to improve system boot speed include a multi-processor processing platform including a first processor on the multi-processor platform in communication with a baseboard management controller (BMC), a serial peripheral interface (SPI) in communication with the BMC, and a boot optimizer in communication with the BMC to redirect read access requests by the first processor from the SPI to a volatile memory associated with the BMC. Some example apparatus include the platform having at least one of a system-on-a-chip (SoC) platform or a socket server platform. Other example apparatus include a platform power monitor to transfer contents of the SPI to the volatile memory in response to detecting a power-up condition of the platform. Some example apparatus include a write request manager to grant write requests to facilitate an image update of the SPI, and a volatile memory interface to update the volatile memory with the image update after the SPI is updated. Other example apparatus include a read request manager to disable read and write requests to an SPI communicatively connected to the first processor.

Some disclosed example articles of manufacture storing machine readable instructions are included that, when executed, cause a machine to associate a first serial peripheral interface (SPI) with a baseboard management controller (BMC), copy an image from the first SPI to a volatile memory in response to receiving power at the BMC, and in response to receiving an access request associated with the first SPI, provide access to the image stored in the volatile memory. Other example articles of manufacture cause the machine to modify access privileges to a second SPI associated with a platform processor, and to block access to the second SPI, or restricting access to the second SPI. Some example articles of manufacture cause the machine to substitute access requests to the second SPI with access requests to the first SPI. Other example articles of manufacture cause the machine to initiate a reset vector request as the access request. Still other example articles of manufacture cause the machine to permit write access privileges to the first SPI in response to detecting a write request and to authenticate the write request prior to permitting the write access privileges to the first SPI. Some example articles of manufacture cause the machine to redirect write access privileges from a second SPI to the first SPI, the second SPI associated with at least one of a platform processor or a system-on-a-chip package, while other example articles of manufacture cause the machine to update the volatile memory with information associated with the write request after a write operation to the first SPI is complete.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to improve boot speed, comprising:
   identifying a first serial peripheral interface (SPI) storage device associated with a processor;
   copying an image from the first SPI storage device to a volatile memory of a baseboard management controller (BMC) in response to receiving power at the BMC; and
   distinguishing between a read request or a write request directed to the first SPI storage device;
   in response to identifying the read request, reducing a latency of the read request by blocking access to the first SPI storage device and redirecting the read request to the image stored in the volatile memory of the BMC; and
   in response to identifying the write request, preparing the first SPI storage device for a subsequent processor power cycle by removing the blocking to the first SPI storage device and updating the first SPI storage device with alternate boot vector instructions.

2. A method as defined in claim 1, further comprising modifying access privileges to a second SPI storage device associated with the processor.

3. A method as defined in claim 2, wherein modifying access privileges to the second SPI storage device comprises at least one of blocking access to the second SPI storage device, or restricting access to the second SPI storage device.

4. A method as defined in claim 2, wherein modifying access comprises substituting access requests to the second SPI storage device with access requests to the first SPI storage device.

5. A method as defined in claim 2, wherein the second SPI storage device is associated with at least one of a system-on-a-chip (SoC) package, or the processor of a socket server system.

6. A method as defined in claim 1, wherein the write request comprises a reset vector request.

7. A method as defined in claim 1, further comprising authenticating the write request prior to permitting write access privileges to the first SPI storage device.

8. A method as defined in claim 1, further comprising redirecting write access privileges from a second SPI storage device to the first SPI storage device, the second SPI storage device associated with at least one of the processor or a system-on-a-chip package.

9. A method as defined in claim 1, further comprising updating the volatile memory with information associated with the write request after a write operation to the first SPI storage device is complete.

10. A method as defined in claim 9, wherein the information associated with the write request comprises an update to the image of the first SPI storage device.

11. A method as defined in claim 1, wherein the image from the first SPI storage device comprises at least one of a boot image or a basic input/output system (BIOS) image.

12. A multi-processor processing platform, comprising:
- a first processor on the multi-processor platform in communication with a baseboard management controller (BMC);
- a serial peripheral interface (SPI) storage device in communication with the BMC; and
- a boot optimizer in communication with the BMC to:
  - distinguish between a read request or a write request from the first processor to the SPI storage device;
  - in response to identifying the read request, reduce a latency of the read read request by blocking access directed to the SPI storage device and redirecting the read request by the first processor to a volatile memory associated with the BMC; and
  - in response to identifying the write request, preparing the SPI storage device for a subsequent processor power cycle by removing the blocking to the SPI storage device and updating the SPI storage device with alternate boot vector instructions.

13. A multi-processor processing platform as defined in claim 12, wherein the platform comprises at least one of a system-on-a-chip (SoC) platform or a socket server platform.

14. A multi-processor processing platform as defined in claim 12, further comprising a platform power monitor to transfer contents of the SPI storage device to the volatile memory in response to detecting a power-up condition of the platform.

15. A multi-processor processing platform as defined in claim 12, further comprising a write request manager to grant write requests to facilitate an image update of the SPI storage device.

16. A multi-processor processing platform as defined in claim 15, further comprising a volatile memory interface to update the volatile memory with the image update after the SPI storage device is updated.

17. A multi-processor processing platform as defined in claim 15, further comprising a read request manager to disable read and write requests to the SPI storage device communicatively connected to the first processor.

18. A tangible machine readable storage medium comprising instructions stored thereon that, when executed, cause a processor platform to, at least:
- identify a first serial peripheral interface (SPI) storage device associated with a processor;
- copy an image from the first SPI storage device to a volatile memory of a baseboard management controller (BMC) in response to receiving power at the BMC; and
- distinguish between a read request or a write request from the processor associated with the first SPI storage device;
- in response to identifying the read request, reduce a latency of the read request by blocking access to the first SPI storage device and redirecting the read request to the image stored in the volatile memory of the BMC; and
- in response to identifying the write request, prepare the first SPI storage device for a subsequent processor power cycle by removing the blocking to the first SPI storage device and updating the first SPI storage device with alternate boot vector instructions.

19. A machine readable storage medium as defined in claim 18, wherein the instructions, when executed, cause the processor platform to modify access privileges to a second SPI storage device associated with the processor.

20. A machine readable storage medium as defined in claim 19, wherein the instructions, when executed, cause the processor platform to block access to the second SPI storage device, or restrict access to the second SPI.

21. A machine readable storage medium as defined in claim 19, wherein the instructions, when executed, cause the processor platform to substitute access requests to the second SPI storage device with access requests to the first SPI storage device.

22. A machine readable storage medium as defined in claim 18, wherein the instructions, when executed, cause the processor platform to initiate a reset vector request as the write request.

* * * * *

UNITED STATES PATENT AND TRADEMARK OFFICE
CERTIFICATE OF CORRECTION

PATENT NO.         : 9,098,302 B2                                   Page 1 of 1
APPLICATION NO.    : 13/536449
DATED              : August 4, 2015
INVENTOR(S)        : Swanson et al.

It is certified that error appears in the above-identified patent and that said Letters Patent is hereby corrected as shown below:

In the Claims

Column 11 line 17 (claim 12): delete "read" (Second Occurrence)

Signed and Sealed this
Eighth Day of March, 2016

Michelle K. Lee
*Director of the United States Patent and Trademark Office*